United States Patent [19]

Rathjen et al.

[11] 4,400,175

[45] Aug. 23, 1983

[54] PROCESS AND AN APPARATUS FOR THE CRYSTALLIZATION OF MELTS WITH A SIMULTANEOUS CRUSHING OPERATION

[75] Inventors: Claus Rathjen; Martin Ullrich, both of Leverkusen, Fed. Rep. of Germany

[73] Assignee: Bayer Aktiengesellschaft, Leverkusen, Fed. Rep. of Germany

[21] Appl. No.: 305,567

[22] Filed: Sep. 24, 1981

[30] Foreign Application Priority Data

Oct. 15, 1980 [DE] Fed. Rep. of Germany ....... 3038973

[51] Int. Cl.³ .............................................. B01D 9/02
[52] U.S. Cl. .................................. 23/295 R; 422/254; 198/662; 366/90; 260/707
[58] Field of Search ..................... 366/81, 88, 90, 322; 422/245, 254; 23/295; 241/26 D; 198/662, 676; 260/707, DIG. 35

[56] References Cited

U.S. PATENT DOCUMENTS

| | | | |
|---|---|---|---|
| 2,598,449 | 5/1952 | Scott et al. | 422/254 |
| 2,679,539 | 5/1954 | McKay | 422/254 |
| 2,778,482 | 1/1957 | Lasch et al. | 198/676 |
| 3,504,400 | 4/1970 | Natov et al. | 198/662 |
| 3,652,064 | 3/1972 | Lehnen et al. | 198/676 |
| 3,885,665 | 5/1975 | Fisher | 198/676 |

FOREIGN PATENT DOCUMENTS 563364 2/1933 Fed. Rep. of Germany ...... 198/662

Primary Examiner—Hiram H. Bernstein
Attorney, Agent, or Firm—Sprung, Horn, Kramer & Woods

[57] ABSTRACT

The product which is present in the form of a melt is cooled and thereby crystallized in a double-shaft worm machine which has self-cleaning worm shafts rotating in the same direction. The crystallizing material is continually crushed in a repeatedly cutting manner during solidification and during the subsequent cooling operation, while maintaining the main transporting direction in the worm. In this manner, crystal agglomerates are prevented from forming which have only solidified on the surface, while still containing liquid portions inside. The process is carried out using a worm machine, the worm profile of which is repeatedly interrupted by introducing grooves, so that only small segment ridges remain.

10 Claims, 7 Drawing Figures

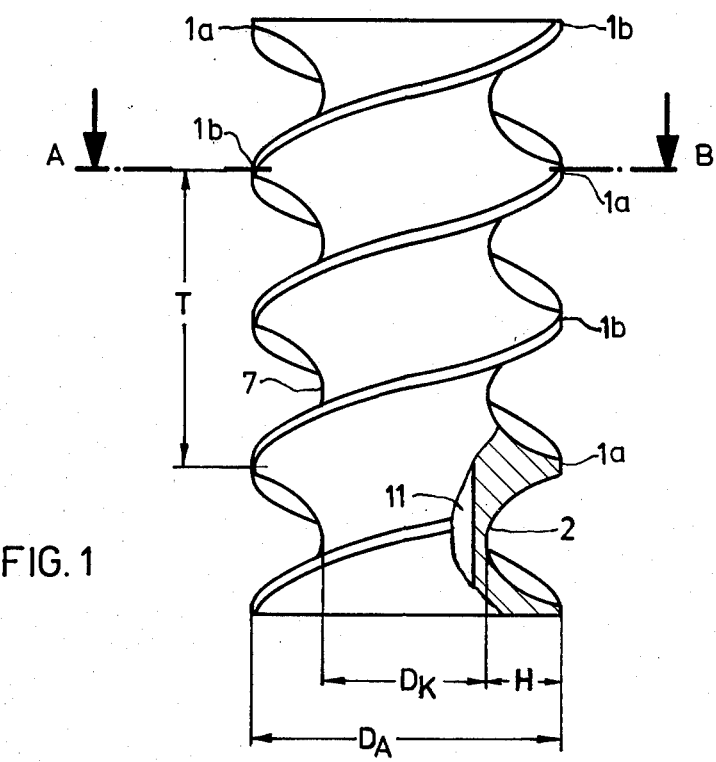
FIG. 1
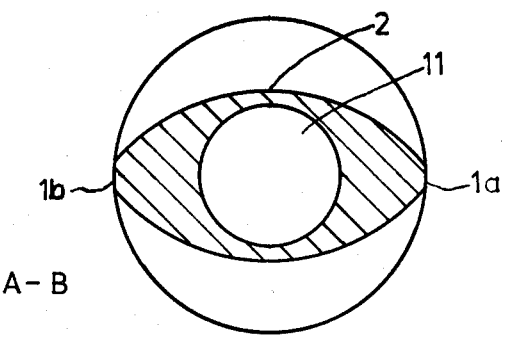
FIG. 2 A-B

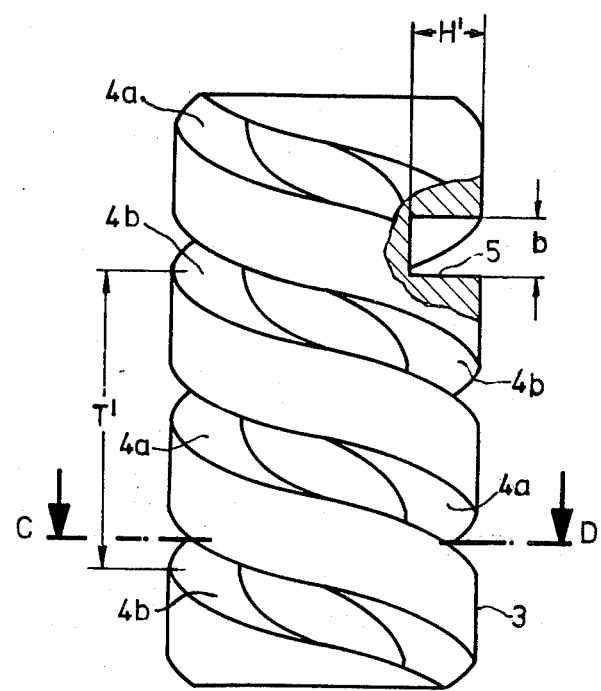
FIG. 3
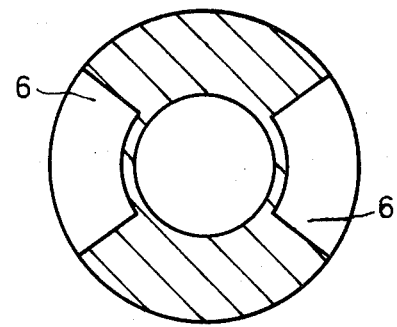
FIG. 4 C-D

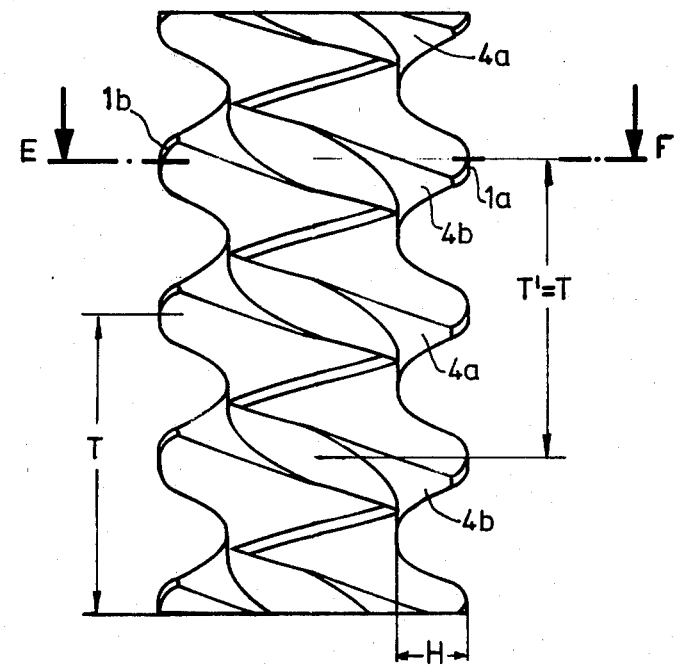
FIG. 5
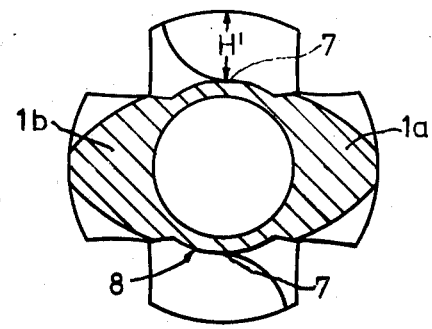
FIG. 6a E-F
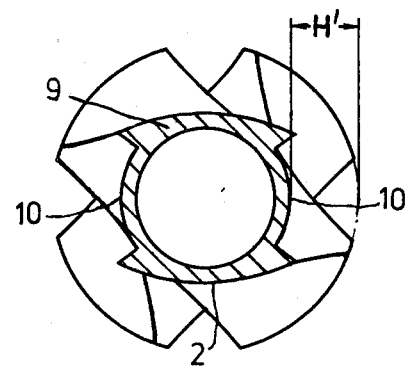
FIG. 6b

PROCESS AND AN APPARATUS FOR THE CRYSTALLIZATION OF MELTS WITH A SIMULTANEOUS CRUSHING OPERATION

BACKGROUND OF THE INVENTION

This invention relates to a process for the crystallization of melts of chemical products in double-shaft, coolable worm machines whose worm shafts rotate in the same direction. The invention also relates to an embodiment of a worm machine which is suitable for carrying out the process.

Crystallizing worms are used successfully, for example, in the chemical industry, when hot, for example heavily fuming or harmful, organic melts are to be converted into the cooled, solid phase in a completely closed apparatus without any contact with the atmosphere. Crystallizing worms are also effective in the case of difficult crystallizing melts which tend to supercool, because in this case, solidification does not take place in complete rest but with continuous movement and shearing and thus the solidification process may be carried out more easily and in an accelerated manner.

Worm machines for crystallizing functions of this type are known. For this purpose, self-cleaning, tightly threaded double worms are used, whose two worm shafts rotate in the same direction and which have a cooled housing. They are described in detail in "Schneckenmaschinen in der Verfahrenstechnik" (Springer-Verlag, 1972) by H. Herrman, [1].

A more recent special development of such worm machines is the double-shaft worm heat exchanger whose shafts rotate in the same direction, that is the ZDS-W produced by Werner and Pfleiderer, which was disclosed in a company brochure [2] 1979. In addition to the housing being cooled, this apparatus offers cooling surfaces for crystallizing processes due to additionally intensively coolable hollow worm shafts and which are continuously scraped off and which are very large. The kinematic coercive self-cleaning operation of all the cooling surfaces prevents the chamber which may be filled with the product from becoming completely blocked against transport of the material by solidification of the melt. There is a continuous force transporting effect in the threaded worm shafts.

Worm machines require for the material transport and the internal shearing procedures a drive power which, in the case of double worms, must also be provided for scraping off the surfaces of the worms. This drive power is converted into frictional heat and it causes the material to heat up. During the crystallization process in worm machines, in addition to the crystallizing heat, this frictional heat also has to be removed over the cooling surface which causes an additional strain on the energy balance of the apparatus. Therefore, attempts have been made to minimize the frictional heat which is itself harmful by a worm geometry which is low in shearing action. In the case of the crystallizing worms mentioned above under number [2], this is effected by a steadily continuous worm thread profile which is low in shearing action (a short counterthread for protecting the shaft sealing against product intrusion is only provided in the open outlet shaft for the solidified crystallized material at the end of the machine). Intensively working mixing and shearing elements known in worm technology according to [1], for example kneading elements, are understandably not used in this case.

However, it has been shown in the practical chemical operation of the crystallizing worms which have been described, that as a result of material movements in the machine which are unusual per se and are particular to this case, the efficiency thereof is greatly restricted. Where there are economic passage conditions, i.e. from medium to high throughputs, large C-shaped product particles which have not completely solidified all through (so-called "small horns") are formed, the largest of which correspond to a negative shape of the worm channel (G. Matz, Chem. Ing. Tech. 52, (1980), P. 570–575). These particles have completely solidifed on their contact surface with the cooling surfaces of the worm and thus they form a stable crust. However, they still contain, enclosed inside, liquid melt or plastic crystal sludge. The particles are so stable because of their surrounding crust that they withstand the friction and pressure forces which are present in the worm and they are transported too rapidly through the machine, because of their C-shaped negative worm channel form, with the maximum possible conveyance of a worm, namely with the so-called screw-nut conveyance. The C-shaped particles mentioned are ejected from the end of the machine and they reheat considerably due to the recrystallization of their plastic core and thus they exhibit a considerable cementing tendency in a stationery discharge. These phenomena are particularly pronounced in the case of rapidly crystallizing materials. A slightly different conveying mechanism produces round particles which, with a maximum diameter equal to the depth of the worm thread, rotate in the worm channel like the balls in a rolling bearing, which effect may also take place on figure-of-eight-shaped tracks in the case of double worms rotating in the same direction. In this case as well, the same effect of a melt inclusion occurs with the above-described negative consequences. Only where there are very low and thus uneconomic throughputs may the required temperatures and properties of the bulk material which is discharged be achieved in the cases which have been described.

SUMMARY OF THE INVENTION

An object of the present invention is to achieve the following in worm machines having an intensively coolable housing and shafts and which are designed for crystallizing processes:

1. to considerably increase the throughput,
2. to conclusively reduce the grain size of the discharge bulk material to a fraction of the depth of the worm thread, and
3. to prevent reheating in the bulk material which is discharged.
4. The means which achieve the objects should be suitable for the relevant class of lightweight construction worms and should not result in marked price increases, as, for example, in the direction of the heavy worm machines for plastics processing also known according to [1].

This object is achieved according to the invention in that the crystallizing material is continually crushed in a repeatedly cutting manner during solidification and subsequent cooling in the solid phase, while maintaining the main transporting direction in the worm.

A considerable increase in the throughput is possible due to this process. In contrast thereto, in the crystallization processes applied hitherto, while using worm machines with comparable throughputs, the temperature at the product outlet was considerably higher so that baking of the product was inevitably expected. Another advantage is that the discharged bulk material is considerably more finely grained. The grain size is still only a fraction of the worm thread depth. The initially-mentioned small horn-shaped product agglomerates which are transported through the worm channel without shearing strain, may be completely avoided by the process according to the invention. For this reason, no recrystallization and thus no reheating either takes place in the discharged bulk material. According to the prior art, reheating occurrences of from 20° to 30° C. were measured on different worm machines. The effect of this reheating was a considerable baking of the discharged bulk material. The product which is crystallized according to the process of the invention is, however, very storable and pourable.

The apparatus for carrying out the process according to the invention is based on a double-shaft worm machine which has hollow and coolable worm shafts rotating in the same direction which are self-cleaning and tightly threaded and have a coolable housing. According to the invention, the worm machine is now modified such that the worm profile is repeatedly interrupted over at least a part of the total length by introducing grooves, and sufficient material is removed from the thread profile such that from 30 to 90%, preferably from 50 to 70%, of the mass of the thread profile remains.

Further developments and preferred embodiments of the invention are described hereinafter.

The known self-cleaning effect of a double-shaft worm machine is lost to some extent as a result of making grooves in the worm profile. Therefore, it was feared that the grooved worm shafts would be added onto by incrustation of the product. Just as the melt starts to crystallize on the cooled metal surfaces or when large product particles shatter and when the internal melt or the crystal sludge is released, a product deposit and thus a partial congestion, if not a blocking, of the worm machine would have been expected. Surprisingly, however, these difficulties do not arise.

Furthermore, practice shows that when using worm shafts with a grooved profile for crystallization procedures, substantially higher driving forces are not required in spite of obviously greater material strains.

Further surprising factors are that the grooved zone is not only efficient at the outlet, but it may also very advantageously extend over long regions of the worm shafts.

Another substantial advantage is seen in the fact that in order to carry out the process according to the invention, conventional commercial crystallization worm machines may be used, the shafts of which are modified by making grooves in the above-described manner. This modification is simple to carry out in terms of production, so that no substantial extra costs arise compared to the value of the machine. These measures may also be subsequently applied on crystallizing worms which are already being used.

The process according to the invention and the relevant apparatus are described in more detail in the following with reference to the drawings, wherein:

BRIEF DESCRIPTION OF THE DRAWINGS

FIG. 1 is a longitudinal section of a continuous double-threaded profile with a right-hand twist;

FIG. 2 is a cross section A-B of the worm shaft according to FIG. 1;

FIG. 3 shows two grooves displaced by 180° in a full cylinder;

FIG. 4 is a cross section C-D in FIG. 3;

FIG. 5 is a longitudinal section of a thread profile which is interrupted by grooves and is produced by superimposing the profiles according to FIGS. 1 and 3;

FIGS. 6a and 6b are a cross section E-F in FIG. 5; of two neighboring shafts

DETAILED DESCRIPTION OF THE INVENTION

Figure 7:
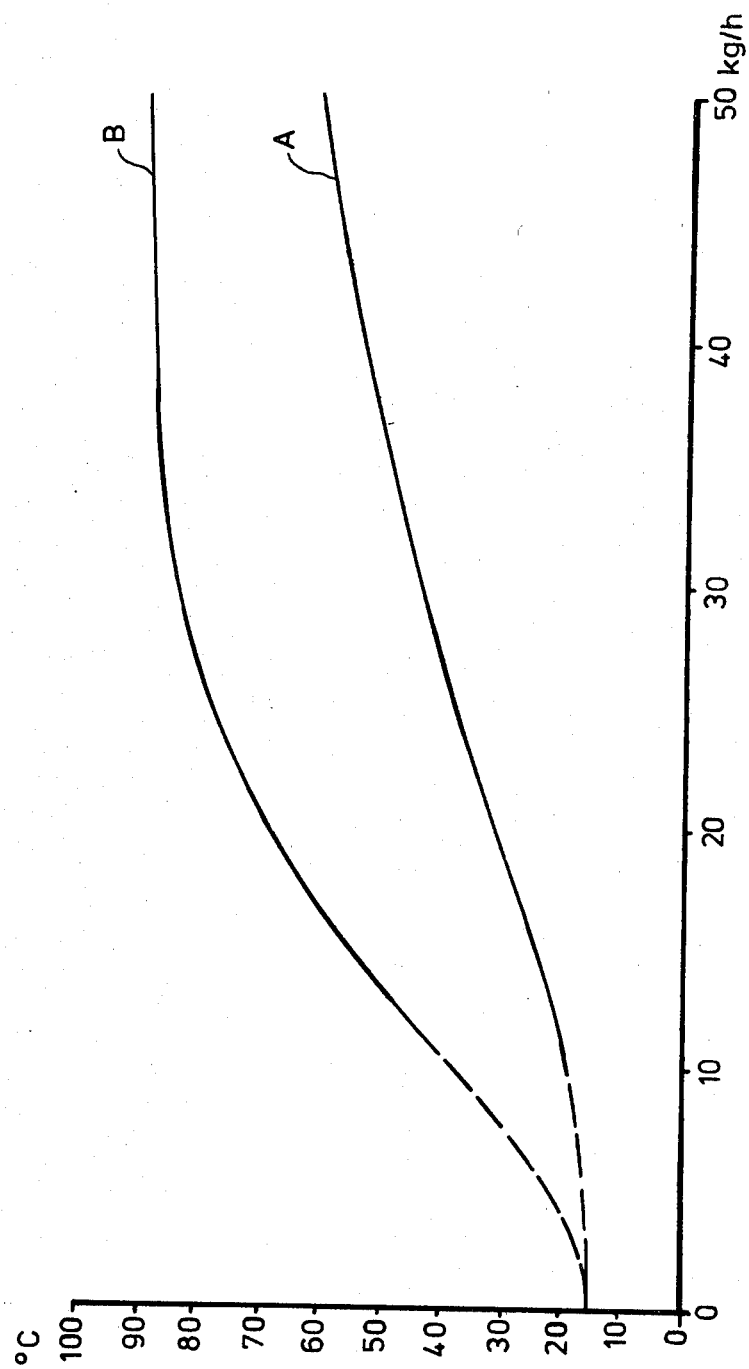
FIG. 7 shows the product outlet temperature as a function of the throughput for a product which was crystallized according to the process of the invention.

The double-threaded, hollow worm shaft according to FIG. 1 consists of the two opposite thread ridges 1a and 1b having an external diameter $D_A$ and a worm core 2 with a core diameter $D_K$. The thread profile formed thereby has a pitch T and a thread depth H. In FIG. 2 which shows the section A-B, the thread number is seen on the two opposite thread ridges 1a and 1b. As may be seen, it is a thread profile having a right-hand twist. A cooling medium flows through the bore 11.

FIG. 3 shows a full cylinder 3 in which two grooves 4a and 4b which are displaced by 180° have been bored with a left-hand twist, in a helical manner. The grooves 4a and 4b have a rectangular profile 5 which appears as a ring segment 6 in the cross section C-D. The pitch of the grooves 4a and 4b is T', the width thereof is b and the depth thereof is H'.

FIGS. 1 to 4 which have been described above are only used to describe a worm profile which is interrupted by grooves, as shown in FIGS. 5 and 6. This repeatedly interrupted worm profile forms the prerequisite in terms of an apparatus for carrying out the process according to the invention.

The interrupted worm profile according to FIGS. 5 to 6 may be imagined by superimposing FIGS. 1 and 3. In order to produce a profile of this type, the worm shaft according to FIG. 1 is clamped in a lathe and one groove 4a is initially made during a regular forward movement and the other groove 4b is made in another working step. The number of grooves (in this case, two) preferably coincides with the thread number of the thread profile which, in this case, has two threads. Likewise, the groove depth H' coincides in this case with the thread depth H, so that the grooves 4a and 4b terminate on the worm core or on the root 7 of the thread (H'=H). The grooves running in a helical manner with the same pitch T'=T and with an opposite twist to the worm profile 1a, b cross the worm profile in regular intervals, so that only small segment ridges remain from the originally continuous thread profile. These segment ridges are each formed by two boundary surfaces approaching each other at an acute angle and by two boundary surfaces approaching each other at an obtuse angle. The acute-angled boundary surfaces lying at the front in the rotational direction are significant for the crushing effect, which is described later on, during crystallization. The width of the grooves 4a and 4b is selected such that when boring the groove, from 30 to 90%, preferably from 50 to 70% of the mass of the thread profile remains. Accordingly, the transporting effect of the worm shaft declines in favor of the crushing effect.

In order to carry out the process according to the invention, both shafts of a double-shaft worm machine which is suitable for crystallization purposes are modified according to FIG. 5, i.e. are provided with grooves. One embodiment which has proved to be particularly successful is one in which the two shafts according to FIGS. 5 and 6 are provided accordingly with two similar grooves (pair of grooves 4a, b) displaced by 180° and the pair of grooves 4a, b of the first shaft is positioned 90° out of phase with the pair of grooves 4a, b of the neighboring shaft in the worm machine. Thus, as seen in cross section, the pair of grooves of the first shaft commences in the thread root 7 (see FIG. 6a), whereas the pair of grooves 4a, b of the neighbouring shaft commences at the thread ridge 10 (see FIG. 6b). For clarification purposes, the worm shafts 8 and 9 in FIGS. 6a and 6b are not illustrated in the engaging position, but in the production position. This embodiment enables the self-cleaning characteristics which are present in a double-shaft worm machine to be maintained as far as possible in spite of the multiple interruptions in the thread ridges. The above-mentioned phase displacement of the grooves causes the remaining segments to come repeatedly into a mutually tightly threaded engagement.

Instead of the helical grooves 4a, b, axially-parallel longitudinal grooves may also be milled in. In this case, a larger number of grooves will be provided, distributed over the circumference, in order to achieve the required multiple interruption in the thread ridge.

As already mentioned above, both shafts of the worm machine used for the crystallization process are preferably modified in the manner specified above. The grooving generally extends over the complete length of the worm shafts. However, groove zones are preferably provided on at least the half of the machine which is positioned downstream. As an alternative to a continuous grooving, zones having grooved thread ridges and zones having ungrooved, i.e. complete thread ridges, may be provided in an alternating manner.

Using a double-shaft, coolable crystallization worm machine having self-cleaning worm shafts which rotate in the same direction and are modified in the manner specified above, an organic product having a melt temperature of 95° C. was crystallized from the melt by cooling. During this operation, a particularly important parameter is the temperature of the crystallized product at the outlet of the machine. The product outlet temperature should be as far below the melt temperature as possible, in order to avoid recrystallization and baking of the crystallized product. In FIG. 7, the product outlet temperature is plotted as a function of the throughput for the process according to the invention (curve A) and for comparison therewith, for a worm machine with otherwise the same data, but with a continuous thread profile corresponding to the prior art (curve B.) The crystallizing worm has, including the hollow worm shafts, a total heat exchange area of 0.43 m$^2$ with a worm external diameter of 51 mm, a worm core diameter of 28 mm, a worm pitch of 48 mm and a worm length of 700 mm. For the process according to the invention, the half of both worm shafts positioned downstream was provided in the above-described manner with grooves having a groove width b of 10 mm, and a rectangular shape. The temperature of the cooling agent was 15° C. It is seen that in the process according to the invention, compared to the prior art, the product outlet temperature increases substantially more gradually with an increasing throughput. The proposition to work with greater throughputs was made as a result of this fact. It may be seen from the diagram that the throughput for a prescribed bulk material temperature, for example of 60° C., may be increased by a factor 3 from approximately 16 kg/h to 48 kg/h. This important advice is based on the fact that the crystallizing material is subjected to a continuous crushing operation during solidification. Therefore, the solidification procedure takes place with the material under a considerable mechanical strain. An agglomeration into larger product lumps is stopped from the very beginning.

The bulk material which is discharged is substantially more finely grained in the process according to the invention and its grain size of less than 2 mm amounts to only a fraction of the worm thread depth of 11.5 mm. In contrast thereto, in the process according to the prior art, large particles of a thickness of 11 mm and from 20 to 30 mm in length are produced where there are higher throughputs.

In the process according to the invention, recrystallization and thus reheating in the discharged bulk material does not take place. According to the prior art, reheating occurrences of from 20° to 30° C. were measured on different worm machines. The result of this reheating was a considerable baking of the discharged bulk material.

The process according to the invention offers a broad spectrum of applications. In particular, the following products may be crystallized according to this process: organic intermediate products, salts, dry primary products, rubber chemicals, plastics primary products and plastics additives and softeners, plant protective agents, pharmaceutical primary products and polyurethane primary products.

We claim:

1. In a process for the crystallization of melts of chemical products in a double-shaft, coolable worm machine with self-cleaning worm shafts rotating in the same direction, the improvement wherein: the crystalline material is continually crushed in a repeatedly cutting manner during solidification and during the subsequent cooling operation in the solid phase, while maintaining the main transporting direction in the worm by providing repeated interruptions over at least a part of the worm profile to form wedge shaped segment ridges.

2. In an apparatus for the crystallization of melts of chemical products having two self-cleaning, tightly threaded, hollow and coolable worm shafts rotatable in the same direction and a coolable housing, the improvement wherein: the worm profile is repeatedly interrupted over at least a part of its complete length by introducing grooves with from 30 to 90% of the mass of the thread profile remaining to form wedge shaped segment ridges to crush the crystalline material by repeated cutting during rotation of the shaft.

3. The apparatus according to claim 2, wherein the remaining means of the profile is from 50 to 70%.

4. The apparatus according to claim 2, further comprising grooved zones alternating with ungrooved zones along the worms.

5. The apparatus according to claim 2 or 4, wherein the grooves are provided on the downstream half of the worms.

6. The apparatus according to claim 2 or 4, wherein the grooves have the same thread depth as the thread profile.

7. The apparatus according to claim 2 or 4, wherein the number of grooves per shaft is the same as the thread number of the thread profile.

8. The apparatus according to claim 2 or 4, wherein the cross section of the grooves seen in the longitudinal section of the shafts one of rectangular and trapezoidal.

9. The apparatus according to claim 2 or 4, wherein the grooves are helical design with the same pitch as the worm thread with an opposite twist.

10. The apparatus according to claim 9, wherein both shafts have two similar grooves displaced by 180° and the pair of grooves of one shaft is disposed 90° out of phase with the pair of grooves of the other shaft, whereby in cross section the pair of grooves of the one shaft commences in the thread root where the pair of grooves of the other shaft commences at the thread ridge.

* * * * *